United States Patent Office 3,428,586
Patented Feb. 18, 1969

3,428,586
WATER DISPERSIBLE COATING COMPOSITION AND USE OF SAME IN ELECTROCOAT PAINTING
Carlton E. Coats, Savage, Minn., assignor to Ashland Oil & Refining Company, Ashland, Ky., a corporation of Kentucky
No Drawing. Filed Sept. 21, 1965, Ser. No. 489,073
U.S. Cl. 260—22    16 Claims
Int. Cl. C08g 39/08; C09d 3/64; B05b 5/02

ABSTRACT OF THE DISCLOSURE

A vehicle for coating compositions comprising a blend of resins which comprises:
(A) as a major component, 65 to 95 weight percent of a polycarboxylic acid resin product prepared by heating
 (1) an alpha, beta-ethylenically unsaturated acid or anhydride,
 (2) an oil comprising a natural drying oil modified with a polymerizable, ethylenically unsaturated monomer, and
 (3) a low molecular weight alcohol until the resulting polycarboxylic acid resin has a viscosity of greater than 15 stokes, and
(B) as a minor component, 5 to 35 weight percent of a polycarboxylic acid anhydride resin prepared by heating
 (1) an alpha, beta-ethylenically unsaturated anhydride and
 (2) an oil selected from the group consisting of natural drying oils and natural drying oils modified with polymerizable, ethylenically unsaturated materials
until the resulting polycarboxylic acid anhydride resin exhibits an increase in viscosity.

These blends of resins find particular utility in electrocoat painting.

---

This invention relates to a resin composition useful as a vehicle in coating compositions. In another aspect, it relates to a water dispersible, partially neutralized resin composition useful as a vehicle in the electrocoat painting of metallic surfaces such as automobile bodies. In a further aspect, it relates to a process for the electrocoat painting of metallic articles with an improved electrocoat painting bath.

In recent years, there has been a great deal of research and commercial activity in the development of water-dispersible resins useful as vehicles in coating compositions. Though a number of such resin systems have been developed, only a limited number have proven satisfactory for many coating applications. Many of such resin systems, when used in the electrocoat painting (or electrodeposition) of metallic substrates, do not have high voltage capability and/or do not result in films with good properties. When such resins are used at high voltages, e.g., 250–500 volts, in an attempt to get high throwing power, the applied resinous film often sags, runs, ruptures or breaks down and develops holes when the film is baked, and thus such resins do not have high voltage capability. The term "throwing power," which is commonly utilized in the field of electrochemical deposition processes, denotes the property by means of which each of the diffent zones of the electrode to be coated by a coating receives essentially the same density of deposited product, even if these zones are located at considerably varying distances from the other electrode. This property is of principal importance for industrial applications, in which the article to be coated with a coating contains spaces, interstices, cracks and other imperfections which will only be partially coated, if at all, if the throwing power of the bath utilized does not have a suitable value. The higher the throwing power of the system, the greater the extent of deposition. The term "high voltage capability" is understood in the art, and used herein, to mean the ability of the resin system to deposit at high voltages a film which has integrity (i.e., not ruptured) and a serviceable thickness (e.g., 0.5 to 2 mils); a resin system which does not have this high voltage capability manifests such inability by extreme gassing, film rupture, excessive film thickness, and rapid rise in amperage during electrocoating.

One very significant resin system which has been developed and has excellent throwing power and other good film properties is that disclosed in copending application, Ser. No. 424,825, filed Jan. 11, 1965. The resin system disclosed and claimed therein is a polycarboxylic acid resin product prepared by mixing (1) an alpha, beta-ethylenically unsaturated material, such as maleic anhydride, (2) a copolymer of a drying oil and a polymerizable ethyenically unsaturated monomer, such as cyclopentadiene, and (3) a low molecular weight material, such as an aliphatic alcohol, and heating the mixture until the resulting polycarboxylic acid resin product has a desirable high viscosity. This polycarboxylic acid resin is neutralized to form a water dispersible resin solution which can be diluted with water to form a solution or dispersion having admirable electrocoating properties, particularly high voltage capability. However, while these desirable results can be obtained with this resin, it is generally necessary that the coating composition or both be prepared within a short time after preparation of the polycarboxylic acid resin because said high voltage capability decreases or deteriorates if the polycarboxylic acid resin product is allowed to age at ambient conditions, e.g., such as encountered during normal storage, for more than five or ten days before the product is neutralized and dispersed in water.

Accordingly, it is an object of this invention to provide an improved resin composition useful as a vehicle in coating compositions. Another object is to provide a water dispersible, partially neutralized resin composition useful as a vehicle in electrocoat painting of metallic surfaces, such coating composition having high throwing power, high voltage capability, and other good film properties even when prepared from a resinous vehicle which has been allowed to age. Another object is to provide a process for electrocoat painting of metallic articles, such as automobile bodies, with an improved electrocoat painting bath made from an improved resinous vehicle. Further objects and advantages of this invention will become apparent to those skilled in the art from the following description and appended claims.

Briefly, I employ as an improved vehicle for coating compositions a partially neutralized, water dispersible blend comprising a major portion of a polycarboxylic acid resin, such as that disclosed in said copending application, and a minor portion of a polycarboxylic acid anhydride resin, such as a maleinized drying oil.

The polycarboxylic acid resin used as the major resin component of my improved vehicle will generally have a hydroxyl value in the range of 20 to 100, an acid value of 30 to 300, preferably 50 to 100, and a viscosity in the range of 15 to 300 stokes (preferably 70 to 200 strokes) as determined on a sample of the resin material when diluted to 80 weight percent nonvolatile solids with an inert solvent, preferably regular mineral spirits. The polycarboxylic acid resins preferably employed as said major portion of my vehicle are, as mentioned above, those disclosed in said copending application, the disclosure of which is incorporated herein by reference. Such resins can be prepared by a one-step procedure in which the alpha, beta-ethylenically unsaturated dicarboxylic material, such as maleic anhydride, is mixed with a chemically modified drying oil, i.e., one having an iodine value greater than 80 and generally less than 250, an acid value less than 10, and an hydroxyl value less than 50 and generally less than 5, such as a copolymer of a drying oil like dehydrated castor oil and/or linseed oil with a polymerizable, ethylenically unsaturated monomer like cyclopentadiene, and the mixture is heated in the presence of a low molecular weight hydroxyl-containing material, such as an aliphatic alcohol, until the desirable increase in viscosity is obtained. Alternatively, the polycarboxylic acid resin of said copending application can be formed by a two-step procedure, in the first step of which the alpha, beta-unsaturated reactant is first heated and reacted with the chemically modified drying oil to form a resinous polycarboxylic acid adduct which is then heated and reacted in a subsequent step with said low molecular weight material until a polycarboxylic acid resin product with said high viscosity is obtained.

Another polycarboxylic acid resin which can be used as the major portion of my improved vehicle is that disclosed and claimed in U.S. Patent 3,098,834, issued July 23, 1963, which resin product comprises a cyclopentadiene modified drying oil resin composition. Other examples of polycarboxylic acid resins which can be used as the major component of my improved vehicle include: drying oils (including semi-drying oils and free unsaturated fatty acids and esters thereof, particularly the natural glycerides) coupled or reacted with an alpha, beta-ethylenically unsaturated dicarboxylic acid or anhydride; coupled glyceride drying oils polymerized with a vinyl-substituted monomer such as styrene, vinyl toluene, butadiene, acrylic acid, acrylonitrile, or other unsaturated polymerizable monomers such as cyclopentadiene. Patents which disclose polycarboxylic acid resins which can be used in this invention to prepare vehicle dispersions include: U.S. Patents Nos. 2,188,883, 2,188,885, 2,188,888, 2,262,923, 2,678,934, 2,285,646, 2,820,711, 2,286,466, 2,188,890, 2,298,914, 2,502,606, 2,634,256, 2,369,683, 2,384,846, and 2,731,481; South African Patents Nos. 62/3314 and 63/525; and Great Britain Patents Nos. 933,175 and 407,957.

The minor component used to prepare the improved vehicle of this invention is any polycarboxylic acid anhydride resin devoid of any hydroxyl groups. Further, the polycarboxylic acid anhydride resin has at least about 50 percent, preferably 75 percent, of its carboxy groups in the form of carboxylic anhydrides. Any of the resins of this nature disclosed in the afore-mentioned patents can be used, provided that their anhydride groups have not been split. Polycarboxylic acid anhydride resin systems which are particularly useful are those drying oils, including semidrying oil, particularly the natural glycerides, coupled or reacted with an alpha, beta-ethylenically unsaturated dicarboxylic acid anhydride or acid thereof which can be converted to anhydride. Generally, the drying oil which can be used to prepare the polycarboxylic acid anhydride component will be a vegetable oil such as cottonseed oil, corn oil, soybean oil, safflower oil, sunflower oil, oiticica oil, tung oil, rapeseed oil, linseed oil, perilla oil, poppyseed oil, tall oil, dehydrated castor oil, blown castor oil, etc., and fish oils such as herring oil, menhaden oil, sardine oil, codfish oil, whale oil, and the like, including mixtures thereof. These oils are unsaturated triglycerides of fatty acids generally having 10 to 24 carbon atoms per molecule. Generally these drying oils will have an iodine value of 50 to 150. The drying oils will generally amount to 50 to 95 weight percent, preferably 60 to 95 weight percent, of the polycarboxylic acid anhydride resin. If desired, such drying oils can be modified by reaction with an alicyclic conjugated diene hydrocarbon, a vinylidene or vinyl-substituted monomer, or a conjugated diene, in the same way that the chemically modified drying oils disclosed in said copending application are prepared. The drying oils can also be modified by reaction with carboxylic acids, including saturated, unsaturated or aromatic acids, such as butyric, stearic, linoleic, abietic, phthalic, and benzoic acids, or anhydrides thereof, which modified oils can be made by transesterification. A commercially available modiefied drying oil which can be used to prepare the polycarboxylic acid anhydride component of my vehicle is a cyclopentadience modified drying oil sold as Admerol 75, which has an iodine value of 120 to 150, an acid value of less than 3, and a hydroxyl value of 2 to 10. These drying oils can be reacted with such alpha, beta-ethylenically unsaturated dicarboxylic acid anhydrides as maleic anhydride and itaconic anhydride, to prepare the polycarboxylic acid anhydride resins used as the minor component of my vehicle. Generally, the amount of anhydride reacted with the drying oil will be from 5 to 45 weight percent, preferably 5 to 20 weight percent, of the total resin-forming reactants. The acid anhydride and the drying oil component are heated until the polycarboxylic acid anhydride resin has a desirable high viscosity. The preparation of these polycarboxylic acid anhydride resins is, as pointed out above, well known in the art, and further description of such preparation will be omitted here in the interest of brevity.

In blending the polycarboxylic acid resins with the polycarboxylic acid anhydride resin to form the novel vehicle of this invention, generally such blend will be made up to 65 to 95 weight percent, preferably 85 to 92 weight percent, of the polycarboxylic acid resin and 5 to 35 weight percent, preferably 7 to 15 weight percent, of the polycarboxylic acid anhydride resin, these percents being based on the total nonvolatile solids of the blend. The two resin components can be blended by mixing the same together in any manner to give said relative proportions. Following their blending, or coincident therewith, the resin material is completely or partially neutralized with ammonia, mono- or poly- primary, secondary and/or tertiary amines, hydroxyl amines, or other inorganic or organic neutralizing agents (preferably water soluble) in an amount sufficient to neutralize from 20 to 150 percent of the theoretical acid groups in the resin, the solution of dispersed resin having, for example, a pH of 7.0 to 9.5. I prefer to use aliphatic, water soluble amines (primary, secondary or tertiary) which will volatilize from the uncured films of my resins at temperatures below 375° F.

Representative neutralizing agents which can be used include ammonia, ammonium hydroxide, mono-, di- and trimethyl amine, mono-, di-, and triethylamine, propylamine, amylamine, methylethylamine, methylbutylamine, allylamine pyrrole, morpholine, mono-, di-, and triethanolamine, mono-, di-, and tri-isopropanolamine, aniline hydroxylamine, ethanolamine, butanolamine, octonolamine, ethylene diamine, 1,3-diaminopropane, benzylamine, the reaction product of ethylene diamine with ethylene oxide, polyglycol amines, N-methyl ethanolamine, n-aminoethyl ethanolamine, cyclohexylamine, tetraethyl ammonium hydroxide, and the like, including mixtures thereof. This neutralization destroys or splits any acid anhyride groups remaining in the resin and causes the formation of the corresponding acid salts.

In employing the vehicle of this invention in electrocoating, I prefer to use those resin blends produced according to this invention with acid values of 50 to 100 and neutralize these resin blends with an amount of amine, such as triethylamine, sufficient to neutralize 20 to 60 percent, preferably 25 to 45 percent, of the theoretical acid groups in the resin blend and have the resin blend dispersed in a mixture of 60 to 95 weight percent of a water-immiscible solvent, such as mineral spirits. Such dispersions appear to have some of the properties of an oil-in-water emulsion. The vehicle dispersion has a non-volatile content of about 1 to 60 weight percent, preferably about 15 to 50 weight percent.

Both clear and pigmented coating compositions, e.g., paints, varnishes, enamels, based on these resin blends can be prepared and can be applied by brushing, rolling, spraying and dipping, though they are especially useful in electrocoating electrically conductive substrates, such as metallic articles. The coatings can be air-dried or baked, depending on the end use.

The resin blends of this invention can be pigmented with conventional paint grinding equipment, e.g., pebble and roller mills. A minor amount of my resin blend or either of the two resin components can be mixed with the pigment as a grinding aid in the preparation of the pigment dispersion. For example, the pigment and a portion of a vehicle can be ground together to form a paste, which is then blended with the remaining portion of the vehicle to produce a coating composition. Pigments (and/or fillers) which can be used representatively include yellow iron oxide, red iron oxide, white lead, zinc oxide, rutile titanium dioxide, magnesium oxide, chromium oxide, antimony oxide, lead chromate, zinc chromate, lithopone, barium sulfate, calcium carbonate, magnesium silicate, aluminum silicate, magnesium carbonate, strontium chromate, silica mica, pumice, bentonite, China clay, diatomiate, talc, blanc fixe, carbon black toluidine red, chromium yellow, phthaloazamine blue, and the like, including mixtures thereof. Dyes or tints can also be used. Other conventional additives can also be incorporated into the coating composition, such as driers (e.g., zinc, cobalt or magnesium naphthenate), antioxidants (e.g., orthoamylcresol), wetting agents (e.g., petroleum sulfonates), optical brighteners, ultraviolet screening agents, etc.

For purposes of electrocoating compositions, I prefer to prepare the electrocoating bath according to the procedure disclosed and claimed in copending application, Ser. No. 424,550, filed Jan. 11, 1965. This later copending application described a "separate entity" technique according to which pigment (and/or filler) and vehicle (or binder) paint components are separately prepared as dispersions of solids and admixed or brought together only in the presence of sufficient bath diluent to disperse these components to the low bath concentrations desired for electrocoating (generally, 5 to 35 weight percent total nonvolatile solids). That is, the pigment and vehicle components are not brought together to form a paint, in the conventional sense, as a preliminary step to the preparation of the bath. Rather, the pigment and vehicle components are maintained as "separate entities" until they are added singly to the bath diluent, with agitation of the diluent during such addition. As such, there never is a high concentration of pigment and vehicle solids in the same formulation.

In using the vehicles of this invention in electrocoating, paints are prepared by admixing the resin blend and pigment to obtain a pigment volume concentration of about 0.1 to 25 weight percent, preferably about 1 to 15 weight percent. The pigmented mixture can be diluted with water (either tap water or, preferably, deionized water to yield baths having 1 to 35, preferably 5 to 15, weight percent nonvolatile solids. Electrocoating of metal surfaces or other electrically conductive objects can be carried out by conventional techniques with such baths, for example, by making the object to be coated the anode of a D.C. electrical circuit and using a metal tank to hold the bath and serve as the cathode. The voltage of the system can be 50 to 1,000 volts, using amperages of 0.1 to 10 amps per square foot of immersed electrode surface and conductivities of 100 to 3,000 ohm$^{-1}$/cm. Electrocoating conditions can be chosen to provide coating with desirable, serviceable thicknesses, e.g., 0.5 to 2 mils, preferably 0.7 to 1.5 mils. The surfaces or articles which can be electrocoated with the vehicles of this invention include any of those which are sufficiently electrically conductive, such as steel, galvanized steel, phosphate-coated steel, aluminum, tin, copper, iron, zinc, etc the nature of the surface or article determining what voltage and other electrocoating conditions should be used to obtain optimum results, these conditions being determined by simple routine tests known in the art. After electrocoating the article, the coated article can be rinsed with water and passed to a stoving area where the coating is cured, for example, 20 minutes at a temperature of 350° F.

The objects and advantages of this invention are further illustrated by the following examples, but it should be understood that the various materials and amounts, the conditions of reaction, and other details used in these examples, should not be construed to unduly limit this invention. In these examples, "parts" means parts by weight.

EXAMPLE I

A polycarboxylic acid resin useful at the major component of the improved vehicle of this invention was prepared in the following manner.

A pressure reactor was charged with 418 parts of dehydrated castor oil, 418 parts of a copolymer (Admerol 75) of 80 wt. percent linseed oil and 20 wt. percent cyclopentadiene, 103.5 parts of maleic anhydride, 15.25 parts of ethylene glycol, 44.5 parts of ethyl Cellosolve, and 207 parts of regular mineral spirits. The reactor was sealed and the reaction mixture heated from room temperature to 430° F. and then held at this temperature for 4¼ hrs., the autogenous pressure during this latter period being 34–37 p.s.i.g. During this latter heating period, samples were periodically withdrawn for viscosity determinations. These samples were diluted from 83 wt. percent nonvolatile solids to 80 wt. percent nonvolatile solids with a 70/30 blend of mineral spirits/n-butanol and the viscosity determined on the diluted samples. The viscosity of the samples increased from 7 stokes after the first hour of heating to 31.5 stokes at the end of the heating period. The reactor was cooled down to 185° F., at which time the viscosity of a withdrawn sample of the reaction mixture was similarly determined and found to be 109.8 stokes. Forty-four parts of said 70/30 blend were added to the cooled resin solution and at 70° F. the product was found to have a viscosity of 11.4 stokes, an acid value of 54.5, and 79.3 wt. percent nonvolatile solids.

EXAMPLE II

A polycarboylic acid anhydride resin useful as the minor component of the improved vehicle of this invention was prepared in the following manner.

A pressure reactor was charged with 800 parts of a copolymer (Admerol 75) of 80 wt. percent linseed oil and 20 wt. percent cyclopentadiene, and 100 parts of maleic anhydride. The reactor was sealed under a nitrogen blanket and the reaction mixture heated to 400° to 422° F. and then held at this temperature for 4⅔ hrs. The resulting polycarboxylic acid anhydride resin product was then mixed with 222 parts of regular mineral spirits to yield a resin solution having 79.7 wt. percent nonvolatile solids, a viscosity of 125 stokes, and an acid number of about 60.

EXAMPLE III

In this example, the improved vehicle of this invention was prepared and evaluated in electrocoat painting by the following procedure. First of all, 202.5 parts of the polycarboxylic acid resin solution of Example I, after aging at ambient conditions for about 5 months, was blended with 22.5 parts of the polycarboxylic acid anhydride resin solution of Example II by mixing the two solutions together with agitation. Thirty percent of the theoretical acid groups of the resulting blend were neutralized by adding to and mixing therewith 5.45 parts of triethylamine, after which 220 parts of deionized water were slowly dripped into the mixture and stirred until the resulting dispersion, which had the appearance of an oil-in-water emulsion, had 40 wt. percent nonvolatile solids. The partially neutralized resin solution was then aged overnight and diluted with deionized water to provide an electrocoating bath ("Bath A") having 6 wt. percent nonvolatile solids and a pH of 8.1. For purposes of comparison, a similar electrocoating bath was prepared by adding 5.45 parts of triethylamine to 225 parts of the said aged polycarboxylic acid resin solution of Example I to achieve 30% theoretical neutralization of the acid groups in the latter. Then 220 parts of deionized water was added to and mixed with the partially neutralized resin solution to obtain an emulsion having 40 wt. percent nonvolatile solids. This latter dispersion was aged 2 days and then diluted with sufficient deionized water to provide an electrocoating bath ("Bath B") having 6 wt. percent nonvolatile solids and a pH of 8.2.

The above described electrocoating baths were then used to coat a plurality of Bonderite 37 test panels (4″ x 6″ of 20-gauge steel precoated with zinc phosphate), at preset direct current. The so-coated panels were withdrawn from the bath in each case, rinsed with tap water, and baked at about 380° F. for 10 minutes. In each electrocoating run, after the panels were fully immersed in the bath to the desired extent, there was recorded the initial amperage, and thereafter, amperages at 15, 30, and 60 (final) seconds. The thickness of the deposition in mils was measured and the appearance of the film noted and recorded.

The apparatus used in carrying out the electrocoating operation was a 1-gal., tin-plated steel can, into which the test panel was lowered until about ¾ of the panel was immersed in the bath, and after one minute the panel was withdrawn. The can was grounded and served as a cathode while the hanger from which each panel depended was connected to the positive pole of a power source so that the panel served as the anode of the electrical circuit.

Electrocoating data and the results obtained are summarized in Table I.

TABLE I

|  | Runs |  |  |  |  |  |  |
|---|---|---|---|---|---|---|---|
|  | Using Bath A |  |  |  |  | Using Bath B |  |
|  | 1 | 2 | 3 | 4 | 5 | 6 | 7 |
| EMF setting, volts | 100 | 200 | 300 | 400 | 500 | 50 | 100 |
| Initial voltage | 90 | 180 | 275 | 365 | 450 | 42 | 80 |
| Final voltage | 100 | 195 | 290 | 385 | 485 | 48 | 92 |
| Initial amps | 0.09 | 0.23 | 0.30 | 0.35 | 0.43 | 0.11 | 0.21 |
| 15 sec. amps | 0.03 | 0.06 | 0.08 | 0.10 | 0.13 | 0.07 | 0.13 |
| 30 sec. amps | 0.01 | 0.04 | 0.05 | 0.06 | 0.09 | 0.06 | 0.11 |
| Final amps | 0.00 | 0.02 | 0.03 | 0.04 | 0.06 | 0.04 | 0.09 |
| Thickness of deposition, mils | 0.25 | 0.70 | 1.00 | 1.2 | 1.6 | 0.70 | (¹) |

¹ Very heavy and thick.

The data of Table I show that the vehicle of this invention (Bath A) had excellent high voltage capability as evidenced by the increased moderate thickness of deposition and moderate amperages obtained at the progressively increased EMF settings and the absence of rupture. The depositions obtained with this vehicle were smooth in appearance or had only very fine orange peel at EMF settings of 100 and 200 and though the films obtained at the higher EMF settings had fine to medium orange peel with minor or fine bumps, it was only at an EMF setting of 500 volts that a slight sagging at the edge of the panel was obtained. Contrawise, in the control runs where the vehicle employed consisted only of the partially neutralized polycarboxylic acid resin (Bath B), a very heavy film was obtained at 100 volts, indicating a low film resistance, which would result in a low throwing power. This poor throwing power was attributed to the fact that the resin had aged for 5 months before the bath was prepared from it (when a bath was prepared from the resin within 5 days of the preparation of the resin, high voltage capability, i.e., as high as 400 volts, had been obtained).

EXAMPLE IV

In this example, a vehicle of this invention was prepared by blending 150 parts of the polycarboxylic acid resin solution of Example I (aged for about 5 months) with 74.5 parts of the polycarboxylic acid anhydride resin solution of Example II. 30% of the theoretical acid groups in this resin blend were neutralized by adding to it 5.53 parts of triethylamine and then mixing the mixture with 270 parts of deionized water to get a dispersion having 36 wt. percent nonvolatile solids. This dispersion was aged overnight and then diluted with sufficient water to provide an electrocoating bath having 6 ft. percent nonvolatile solids. The electrocoating properties of this bath were then determined by coating a plurality of test panels according to the procedure described in Example III. Electrocoating data and the results obtained are set forth in Table II.

TABLE II

|  | Runs |  |  |  |  |  |
|---|---|---|---|---|---|---|
|  | 1 | 2 | 3 | 4 | 5 | 6 |
| EMF setting, volts | 100 | 200 | 300 | 400 | 500 | 600 |
| Initial voltage | 90 | 180 | 275 | 365 | 460 | 550 |
| Final voltage | 100 | 190 | 290 | 388 | 485 | 590 |
| Initial amps | 0.12 | 0.20 | 0.30 | 0.35 | 0.43 | 0.50 |
| 15 sec. amps | 0.05 | 0.06 | 0.10 | 0.11 | 0.15 | 0.16 |
| 30 sec. amps | 0.03 | 0.05 | 0.06 | 0.08 | 0.10 | 0.10 |
| Final amps | 0.0 | 0.02 | 0.05 | 0.05 | 0.06 | 0.06 |
| Thickness of deposition, mils | 0.25 | 0.35 | 0.70 | 0.90 | -------- | 1.4 |

The data of Table II show the high voltage capability of the resin system of this invention, as evidenced by the progressively increased thickness of deposition with increased EMF setting.

The throwing power of the above described electrocoat painting bath was also evaluated by immersing in the bath a ⅜ inch I.D. steel tube with a 20-gauge steel strip of metal diametrically inserted in the tube. After such immersion, the tube and strip were electrocoated for 15 secs. with a preset field of 500 volts. Upon examination, it was found that the deposited film extended 5.5 cm. from the mouth of the tube, thus indicating that the resin used in the bath had good throwing power.

EXAMPLE V

In this example, the improved vehicle of this invention was prepared by blending 150 parts of the polycarboxylic acid resin solution of Example I (aged about 4.5 months) with 81 parts of a polycarboxylic acid anhydride resin solution prepared like that of Example II, and having 74.5 wt. percent nonvolatile solids, a viscosity of 79.0 stokes, and an acid number of 63.3. Thirty percent of the theoretical acid groups in the blend were neutralized by adding 4.2 parts of diethylamine and then slowly dripping into the mixture 220 parts of deionized water.

The dispersion was aged overnight and then diluted to 6% nonvolatile solids with deionized water, the resulting bath have a pH of 7.35. The electrocoating properties of the bath were then determined using the procedure of Example III. Electrocoating data and results are summarized in Table III.

TABLE III

| | Runs | | | | | |
|---|---|---|---|---|---|---|
| | 1 | 2 | 3 | 4 | 5 | 6 |
| EMF setting, volts | 100 | 200 | 300 | 400 | 500 | 600 |
| Initial voltage | 92 | 170 | 265 | 355 | 445 | 540 |
| Final voltage | 98 | 190 | 285 | 385 | 485 | 580 |
| Initial amps | 0.16 | 0.25 | 0.30 | 0.46 | 0.56 | 0.70 |
| 15-sec. amps | 0.04 | 0.08 | 0.11 | 0.15 | 0.18 | 0.21 |
| 30-sec. amps | 0.02 | 0.05 | 0.09 | 0.10 | 0.11 | 0.15 |
| Final amps | 0.01 | 0.03 | 0.06 | 0.06 | 0.07 | 0.09 |
| Thickness of deposition, mils | 0.45 | 0.60 | 1.1 | 1.5 | 2.1 | 3.0 |

The data of Table III again show the high throwing power obtained with the vehicle of this invention. This throwing power was also evaluated with the steel tube technique described at the end of Example IV, which evaluation showed that the throwing power of the resin blend was 5.0 cm.

EXAMPLE VI

In this example, a vehicle of this invention was prepared by blending 201 parts of a polycarboxylic acid resin solution with 22.4 parts of a polycarboxylic acid anhydride resin solution and 5.17 parts of triethylamine (which was sufficient to neutralize 30% of the theoretical acid groups in the blend) and then slowly dripping into the mixture 220 parts of deionized water with mixing to give a vehicle dispersion having 40 wt. percent nonvolatile solids. This dispersion was aged overnight and then diluted with sufficient deionized water to provide an electrocoating bath having 6 wt. percent nonvolatile solids, a conductivity of 229 ohms/cm.$^2$, and a pH of 8.6. The polycarboxylic acid resin solution used in this example was prepared like that in Example I, and it had been aged about 2 days before use herein as described; this resin solution had 80.5 wt. percent nonvolatile solids, a viscosity of 134 stokes, and an acid number of 52.5. The polycarboxylic acid anhydride resin solution used in this example was that prepared according to Example II.

The electrocoating properties of the bath prepared according to this example were determined by coating a plurality of 4" x 12" Bonderite 37 test panels according to the procedure described in Example III. Electrocoating data and the results obtained are set forth in Table IV.

TABLE IV

| | Runs | | | |
|---|---|---|---|---|
| | 1 | 2 | 3 | 4 |
| EMF setting, volts | 100 | 300 | 400 | 500 |
| Initial voltage | 95 | 270 | 362 | 450 |
| Final voltage | 100 | 290 | 387 | 481 |
| Initial amps | 0.11 | 0.34 | 0.42 | 0.50 |
| 15-sec. amps | 0.02 | 0.11 | 0.14 | 0.16 |
| 30-sec. amps | 0 | 0.09 | 0.10 | 0.11 |
| Final amps | 0 | 0.15 | 0.06 | 0.08 |
| Thickness of deposition, mils | 0.2 | 0.8 | 1.1 | 1.5 |

The data of Table IV again show the high voltage capability obtained with the vehicle of this invention. The throwing power of the system was also evaluated with the steel tube technique described at the end of Example IV, using a preset direct current of 300 volts, which evaluation showed that the throwing power of the resin blend was 4.8 cm.

EXAMPLE VII

In this example, a vehicle of this invention was prepared by blending 149 parts of a polycarboxylic acid resin solution with 75 parts of a polycarboxylic anhydride resin solution and 5.31 parts of triethylamine (which was sufficient to neutralize 30% of the theoretical acid groups in the blend) and then slowly dripping into the mixture 270 parts of deionized water with mixing to give a vehicle dispersion having 40 wt. percent nonvolatile solids. This dispersion was aged overnight and then diluted with sufficient deionized water to provide an electro-coating bath having 6 wt. percent nonvolatile solids, a conductivity of 216 ohms$^{-1}$/cm. and a pH of 8.2. The polycarboxylic acid resin solution and the polycarboxylic acid anhydride resin solution used in this example were the same as that of Example VI.

The electrocoating properties of the bath prepared according to this example were determined by coating a plurality of 4" x 12" test panels according to the procedure described in Example III. Electrocoating data and the results obtained are set forth in Table V.

TABLE V

| | Runs | | | |
|---|---|---|---|---|
| | 1 | 2 | 3 | 4 |
| EMF setting, volts | 100 | 300 | 400 | 500 |
| Initial voltage | 94 | 270 | 360 | 450 |
| Final voltege | 100 | 291 | 386 | 481 |
| Initial amps | 0.17 | 0.36 | 0.45 | 0.55 |
| 15-sec. amps | 0.05 | 0.12 | 0.15 | 0.18 |
| 30-sec. amps | 0.02 | 0.07 | 0.11 | 0.13 |
| Final amps | 0.01 | 0.14 | 0.07 | 0.09 |
| Thickness of deposition, mils | 0.25 | 0.60 | 0.80 | 1.1 |

The data of Table V again show the high voltage capability obtained with the vehicle of this invention. The throwing power of this system was also evaluated with the steel tube technique described at the end of Example IV, using a preset direct current of 500 volts, which evaluation showed that the throwing power of the resin blend was 4.6 cm.

EXAMPLE VIII

In this example, a pigmented electrocoating bath, suitable as a electrocoating bath for applying a primer to automobile bodies, was made as follows. First of all, preparing a pigment dispersion by mixing in a pebble mill to 7.5 Hegman 451 parts of the polycarboxylic acid anhydride product of Example II with 77.90 parts of triethylamine, 768 parts of deionized water, 240 parts of iron oxide pigment (C. K. Williams Company, RO-3097), and 960 parts of barytes (DeLore Company X5R) for 18 hours, after which 120 further parts of deionized water was added to lower the viscosity. A vehicle dispersion was then prepared by vigorously mixing to a temperature of 100-105° F. 1,520 parts of the polycarboxylic acid resin product of Example I, 169 parts of the polycarboxylic acid resin product of Example II, and 40.91 parts of triethylamine; 1,650 parts of deionized water was then dripped into the mixture with mixing and the vehicle dispersion was aged overnight. The electrocoating bath was prepared by diluting 3,502 parts of said vehicle dispersion with 618 parts of deionized water (to obtain 34 wt. percent nonvolatile solids) and this dispersion was then added to about 11,000 parts of deionized water; 826 parts of said pigment dispersion was then added to the diluted vehicle dispersion, followed by the addition of sufficient water to provide an electrocoating bath having about 10 wt. percent nonvolatile solids, a conductivity of 443 ohms$^{-1}$/cm. and a pH of 8.65.

The electrocoating properties of the bath were then determined by coating two Bonderite 37 test panels (4" x 20" of 20-gauge steel precoated with zinc phosphate) at different preset direct current voltages, at a bath temperature of 69° F., in a manner similar to that described in Example III. However, in these electrocoating runs, the test panel was immersed in the bath until ⅚ of its surface area was immersed. Electrocoating data for these runs are set forth in Table VI.

TABLE VI

|  | Panel 1 | Panel 2 |
| --- | --- | --- |
| EMF setting, volts | 400 | 500 |
| Initial voltage | 345 | 440 |
| Final voltage | 380 | 475 |
| Initial amps | 0.85 | 1.05 |
| 15-sec. amps | 0.37 | 0.46 |
| 30-sec. amps | 0.26 | 0.33 |
| Final amps | 0.17 | 0.22 |
| Thickness of deposition, mils | 1.0 | 1.5 |

The baked panels exhibited good appearance in that they were moderately glossy and had only slight orange peel.

The corrosion resistance of Panel 1 of Table VI was then evaluated by the salt-spray technique. In this corrosion test, the uncoated ⅙ of the panel was dipped into a solvent-thinned air-dry primer to protect the baked coated area, during the subsequent salt-spray exposure, from any corrosion which might otherwise migrate from the uncoated area during the course of the salt-spray test. Two 9″ lines were scored on one side of the panel in the form of an X. The cored panel was then placed in a rack so that it was at an angle of 15° from the vertical, said ⅙ portion of the panel forming the lower end. The rack with the panel loaded in it was the placed in a salt-spray cabinet where it was sprayed with a 5% aqueous solution at 90–95° F. After 238 hours of such exposure, the panel was removed from the salt-spray cabinet, rinsed with water, and patted dry with paper towelling. Masking tape, 1″ in width, was placed firmly over one of the legs of the X and then ripped or pulled back rapidly at 180°, the placing of this tape and its removal occurring within 5 min. after the panel was removed from the salt-spray cabinet. Upon examining the panel after tape was removed, it was found that where coating was removed with the tape, the removed coating extended less than 1/16 of an inch from the scored line. This minimal removal of coating, or minimum "creep," showed the good adhesion the coating had for the panel and its desirable corrosion resistance. Other coated or unscored portions of the panel which were exposed to the salt-spray had only insignificant areas of rust and were absent of blistering or other imperfections.

The throwing power of the pigmented resin composition of this example was evaluated as follows. Three Bonderite 37 panels were clamped together at one end and separated ¼ of an inch at the other end with spacers, the spacing between the panels at their midpoint being about ⅛ of an inch. The clamped panels were then immersed in the above-described bath and electrocoated therewith at a preset direct current of 400 volts in the manner described in Example III. After electrocoating, the panels were separated, rinsed with water, and baked 20 min. at 360° F. The outside surface of one of the outer panels had an average thickness of 1 mil. The inside surface of this outer panel was representative of the inner surface of all three panels, and it was completely coated, thus establishing the thowing power at 100%, the coating on this surface having a thickness of 0.2 mil at the lower end and a thickness of 0.75 mil at the upper end.

Another panel was electrocoated with the above-described pigmented resin composition using a preset direct current of 400 volts and rinsed and baked in the manner described. This primed panel was water-sanded with No. 400 sandpaper from 1 mil. thickness to 0.75 mil thickness. The sanded panel was rinsed with deionized water to remove sanded residue, wiped with paper toweling, and then wiped naphtha and baked at 265° F. for 5 min. to dry the panel. A white, thermosetting, solvent-thinned acrylic enamel of automotive topcoat quality was sprayed over the sanded area of the panel until it had a total coating thickness of 2.5 mils. The sprayed panel was then baked 17 min. at 265° F. This topcoated baked panel had a 60° Gardner gloss reading of 95° and a 20° Gardner gloss reading of 85°. The topcoated baked panel was then scored with a pen knife to form a 1-inch square grid of bisected ⅛″ squares. Masking tape was firmly placed over the scored grid and ripped off rapidly at 180°. No significant amount of coating was removed with the tape when it was ripped off; the geometry of the grid was still intact and discreet. The topcoated panel was also subjected to a Gardner frontal impact test (80 inch-pounds), with the result that no delamination of the coating, either primer or top coat, resulted. These tests attest to the desirable firm adhesion of the primer to the panel and the topcoat to the primer.

Various modifications and alterations of this invention will become apparent to those skilled in the art from the foregoing description without departing from the scope and spirit of this invention, and it should be understood that this invention is not to be limited unduly to those illustrative embodiments of this invention described herein.

I claim:
1. A vehicle for coating compositions comprising a blend of resins which comprises:
 (A) as a major component, 65 to 95 weight percent of a polycarboxylic acid resin product prepared by heating:
  (1) an alpha, beta-ethylenically unsaturated acid or anhydride,
  (2) an oil comprising a natural drying oil modified with a polymerizable, ethylenically unsaturated monomer, and
  (3) a low molecular weight alcohol until the resulting polycarboxylic acid resin has a viscosity of greater than 15 stokes, and
 (B) as a minor component, 5 to 35 weight percent of a polycarboxylic acid anhydride resin prepared by heating
  (1) an alpha, beta-ethylenically unsaturated anhydride and
  (2) an oil selected from the group consisting of natural drying oils and natural drying oils modified with polymerizable, ethylenically unsaturated materials until the resulting polycarboxylic acid anhydride resin exhibits an increase in viscosity.

2. The composition according to claim 1 wherein said component (A) is prepared by first reacting components (1) and (2) to form an adduct, mixing said adduct with component (3), and heating the mixture to form the polycarboxylic acid resin (A) with said desirably high viscosity.

3. The composition according to claim 1 wherein said component (A) is prepared by charging components (1), (2) and (3) to a reaction vessel and heating the resulting mixture until said desirably high viscosity is obtained.

4. A vehicle for coating compositions comprising a blend of resins which comprises:
 (A) as a major component, 65 to 95 weight percent of a polycarboxylic acid resin product prepared by heating:
  (1) an adduct of an alpha, beta-ethylenically unsaturated dicarboxylic acid anhydride and an oil comprising a natural drying oil modified by copolymerization thereof with a polymerizable, ethylenically unsaturated monomer selected from groups of monomers consisting of alicyclic conjugated diene hydrocarbons, vinylidene-substituted compounds, and conjugated dienes, with
  (2) a low molecular weight, hydroxyl-containing alcohol until the resulting polycarboxylic acid resin product has a viscosity greater than that of said adduct, and (B) as a minor component, 5 to 35 weight percent of a polycarboxylic acid anhydride adduct of an alpha, beta-ethylenically unsaturated dicarboxylic acid anhydride and an oil selected from the group consisting of natural drying oils and natural drying oils modified with polymerizable, ethylenically unsaturated monomers until the resulting polycarboxylic acid anhydride resin exhibits an increase in viscosity.

5. A vehicle for coating compositions comprising a blend of resins which comprises
(A) as a major component, 65 to 95 weight percent of a polycarboxylic resin product prepared by heating at a temperature of 200° to 450° F.
  (1) an adduct of 5 to 45 wt. percent of an alpha, beta-ethylenically unsaturated acid anhydride and a natural drying oil modified by copolymerization thereof with a polymerizable, ethylenically unsaturated monomer selected from the group of monomers consisting of alicyclic conjugated diene hydrocarbons, vinylidene-substituted compounds, and conjugated diene hydrocarbons, said modified drying oil having an iodine value greater than 80, an acid value less than 10, and an hydroxyl value less than 50, with
  (2) a low molecular weight, hydroxyl-containing alcohol in an amount of 50 to 150 percent of the stoichiometric amount necessary to react with all the theoretical acid groups in said acid anhydride until the viscosity of the resulting polycarboxylic acid resin product is greater than that of said adduct; and
(B) as a minor component, 5 to 35 weight percent of a polycarboxylic acid anhydride adduct of an alpha, beta-ethylenically unsaturated dicarboxylic acid anhydride and an oil selected from the group consisting of natural drying oils and natural drying oils modified with polymerizable, ethylenically unsaturated monomers, said adduct being devoid of hydroxyl groups and having at least about 50 percent of its carboxyl groups in the form of carboxylic acid anhydrides.

6. The vehicle according to claim 5 wherein, in the preparation of major component (A), said anhydride is maleic anhydride, said drying oil is linseed oil, and said polymerizable monomer is cyclopentadiene.

7. The vehicle of claim 5 wherein said low molecular weight alcohol is ethylene glycol.

8. The vehicle of claim 5 wherein said minor component (B) comprises an adduct of maleic anhydride and linseed oil modified by copolymerization thereof with cyclopentadiene.

9. The composition prepared by neutralizing the vehicle of claim 1 to form a water-dispersible resin solution.

10. The composition prepared by mixing the neutralized resin vehicle of claim 9 with a pigment dispersion to form a paint.

11. The composition prepared by adding, to the paint of claim 10, sufficient water to provide a dispersion having 2 to 35 wt. percent non-volatile resin solids.

12. The composition prepared by neutralizing the resin vehicle of claim 5 to form a water-dispersible resin solution and mixing the neutralized resin solution with a pigment dispersion to form a paint.

13. In the process of electrocoat painting of electrically-conductive substrates using an electrocoating bath, the improvement which comprises employing, as said bath, the composition of claim 11.

14. In a process for preparing a resin composition useful as a vehicle in coating compositions, the steps comprising:
(A) blending:
  (1) as a major component, 65 to 95 weight percent of a polycarboxylic acid resin product prepared by heating
    (a) an alpha, beta-ethylenically unsaturated acid or anhydride
    (b) an oil comprising a natural drying oil modified with a polymerizable, ethylenically unsaturated monomer and
    (c) a low molecular weight alcohol until the resulting polycarboxylic acid resin has a viscosity of greater than 15 stokes, and
  (2) as a minor component, 5 to 35 weight percent of a polycarboxylic acid anhydride resin prepared by heating
    (a) an alpha, beta-ethylenically unsaturated anhydride and
    (b) an oil selected from the group consisting of natural drying oils and natural drying oil modified with polymerizable, ethylenically unsaturated monomers until the resulting polycarboxylic acid anhydride resin exhibits an increase in viscosity,
(B) neutralizing the resin blend by adding to the blend a neutralizing agent in an amount sufficient to neutralize from 20 to 150 percent of the theoretical acid groups in the resin, and
(C) dispersing the neutralized resin blend in a mixture of 60 to 95 wt. percent of a water-immiscible solvent.

15. The process of claim 14 wherein a pigment dispersion is added to the resin vehicle dispersion to form a paint.

16. The process of claim 15 wherein the pigment resin vehicle dispersion is diluted with water to form a paint having 1 to 35 wt. percent nonvolatile solids.

References Cited
UNITED STATES PATENTS

| | | | |
|---|---|---|---|
| 3,098,834 | 7/1963 | Jerabek | 260—23.7 |
| 3,228,900 | 1/1966 | Spellberg et al. | 260—23 |
| 3,230,162 | 1/1966 | Gilchrist | 204—181 |
| 3,293,201 | 12/1966 | Shahade et al. | 260—23 |

DONALD E. CZAJA, *Primary Examiner.*

R. W. GRIFFIN, *Assistant Examiner.*

U.S. Cl. X.R.

260—23, 23.7, 29.6, 32.4, 32.6, 29.7, 33.4, 33.6, 40, 41, 41.5; 117—134; 204—181